US008874492B2

(12) United States Patent
Zacharia et al.

(10) Patent No.: US 8,874,492 B2
(45) Date of Patent: Oct. 28, 2014

(54) FLIGHT CACHING METHODS AND APPARATUS

(75) Inventors: Giorgos C. Zacharia, Winchester, MA (US); Paul M. English, Arlington, MA (US); Travis M. Gebhardt, Maynard, MA (US); Dmitry Tkach, Danvers, MA (US); Kosmas Karadimitriou, Shrewsbury, MA (US); Vinayak V. Ranade, Somerville, MA (US)

(73) Assignee: Kayak Software Corporation, Norwalk, CT (US)

( * ) Notice: Subject to any disclaimer, the term of this patent is extended or adjusted under 35 U.S.C. 154(b) by 97 days.

(21) Appl. No.: 13/407,035

(22) Filed: Feb. 28, 2012

(65) Prior Publication Data

US 2013/0024404 A1   Jan. 24, 2013

Related U.S. Application Data

(60) Provisional application No. 61/447,263, filed on Feb. 28, 2011.

(51) Int. Cl.
*G06F 17/00* (2006.01)
*G06N 5/02* (2006.01)
*G06Q 10/02* (2012.01)

(52) U.S. Cl.
CPC .................................... *G06Q 10/02* (2013.01)
USPC .......................................................... 706/12

(58) Field of Classification Search
CPC combination set(s) only.
See application file for complete search history.

(56) References Cited

U.S. PATENT DOCUMENTS 6,397,212 B1 *   5/2002   Biffar ............................ 707/704

* cited by examiner

*Primary Examiner* — Michael B Holmes
(74) *Attorney, Agent, or Firm* — Wolf, Greenfield & Sacks, P.C.

(57) ABSTRACT

According to some aspects, a system is provided comprising at least one computer readable storage medium storing a cache of flight information comprising a plurality of flight solutions, the cache capable of being accessed to obtain flight solutions that meet a criteria specified in one or more flight search queries, and at least one computer programmed to apply at least one machine learning model to at least some of the flight information in the flight information cache to classify at least one of the plurality of flight solutions according to an assessed fidelity of the at least one flight solution, and perform at least one action based on the classified at least one flight solution.

36 Claims, 6 Drawing Sheets

FLIGHT CACHING METHODS AND APPARATUS

RELATED APPLICATION

This application claims priority under 35 U.S.C. §119(e) to Provisional Application Ser. No. 61/447,263, entitled "Flight Caching Methods and Apparatus," filed Feb. 28, 2011, which is herein incorporated by reference in its entirety.

BACKGROUND

Online flight search services often utilize pricing engines (e.g., ITA, Expedia BFS, Amadeus, etc.), Global Distribution Systems (GDSs), Online Travel Agencies (OTAs), and/or direct airline websites (collectively referred to herein as "flight information resources") to obtain flight options in response to user queries. Queries to obtain flight information are often performed via XML APIs or HTTP integrations that allow the flight search service to pass different parameters affecting complexity and guiding the search. These parameters range from origin/destination and departure/return date pairs, to the number of maximum stops to be allowed in the particular flight search, to the graph-theory complexity of the search algorithm for combining different airlines for interline solutions (combinations of a two separate airline carriers, with interlining agreements).

SUMMARY

Some embodiments include a method comprising generating a flight information cache storing flight information comprising a plurality of flight solutions, the cache capable of being accessed to obtain flight solutions that meet a criteria specified in one or more flight search queries, applying at least one machine learning model to at least some of the flight information in the flight information cache to classify at least one of the plurality of flight solutions according to an assessed fidelity of the at least one flight solution, and performing at least one action based on the classified at least one flight solution.

Some embodiments include at least one computer readable storage medium storing instructions, that when executed by at least one processor, performs a method comprising generating a flight information cache storing flight information comprising a plurality of flight solutions, the cache capable of being accessed to obtain flight solutions that meet a criteria specified in one or more flight search queries, applying at least one machine learning model to at least some of the flight information in the flight information cache to classify at least one of the plurality of flight solutions according to an assessed fidelity of the at least one flight solution, and performing at least one action based on the classified at least one flight solution.

Some embodiment include a system comprising at least one computer readable storage medium storing a cache of flight information comprising a plurality of flight solutions, the cache capable of being accessed to obtain flight solutions that meet a criteria specified in one or more flight search queries, and at least one computer programmed to apply at least one machine learning model to at least some of the flight information in the flight information cache to classify at least one of the plurality of flight solutions according to an assessed fidelity of the at least one flight solution, and perform at least one action based on the classified at least one flight solution.

DETAILED DESCRIPTION

Figure 1:
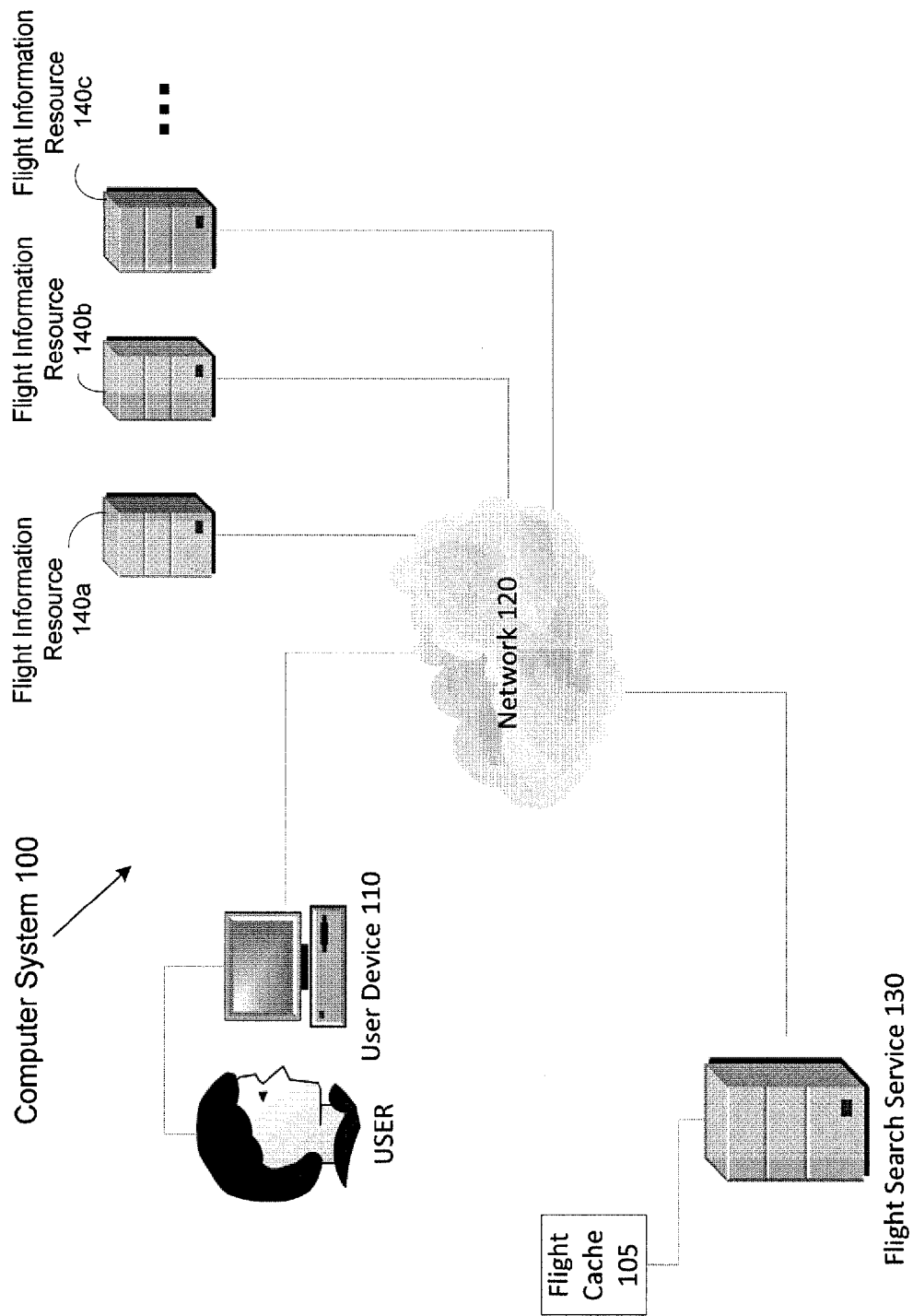
FIG. 1 illustrates an exemplary computer system on which embodiments described herein may be performed.

Requesting all available flight information corresponding to a particular user query directly from appropriate flight information resources each time a user makes a query can be time consuming, thereby reducing the desirability and/or usability of the flight search service. Thus, to avoid the overhead involved in querying the flight information resources for all possible flight solutions that meet the criteria of a user query, some portion of the flight information available at the flight information resources may be cached by the flight search service. When a user requests flight information corresponding to one or more given criteria, the flight search service can query the cached information to obtain the flight solutions/results that meet the one or more criteria instead of incurring the time and cost associated with querying the flight information resource(s) directly to obtain the available flight solutions/results.

There are, however, some drawbacks and/or limitations associated with such caching approaches. As a practical matter, a cache may not include all flight information that is available from the numerous sources of flight information, as doing so would typically be time and cost prohibitive and could, to some extent, negate at least some benefits of generating and maintaining a cache. In particular, the number of live queries that a flight search service can perform with available flight information resources may be limited to a contractually agreed upon volume, or may be paid for on a per query basis. In addition, live queries take time to perform and so have an associated time cost. Thus, each query to one or more flight information resource has an associated "cost," in terms of using a limited number of allotted queries, in terms of monetary cost and/or in terms of the time expense of performing the query.

Accordingly, it may be important to optimize (to the extent possible) which flight information, from the vast quantity of flight information that can be obtained from flight information resources using relatively costly queries, should be queried for caching such that the cache produces acceptable hit rates without imposing unsatisfactory time and cost burdens. As used herein, hit rate refers to the relatively frequency or percentage of user queries that can be resolved by accessing a cache rather than performing a live query. The inventors have developed a number of techniques that facilitate building and maintaining a flight cache that generally optimizes the cache by maximizing the hit rate while minimizing the cost associated with generating the cache. Techniques include, but are not limited to, obtaining flight information for the cache from a third party that itself has performed live queries, intelligent priming of the cache, and predictive modeling, as discussed in further detail below.

Another drawback of caching solutions relates to the fact that portions of the flight information stored in a cache may become stale and/or may be unreliable for other reasons. For example, availability, departure/arrival times, pricing or the existence of a flight altogether may change without being reflected in the cache, as these parameters are subject to change on a relatively continuous basis. As a result, flight information provided in response to a user query may present inaccurate pricing, or may produce flights with incorrect departure/arrival times, present flights that are unavailable (e.g., flights that are fully booked), and/or flights that have been canceled and/or are no longer in operation. To address this substantial problem, the inventors have developed methods to analyze and process a cache of flight information to identify potentially stale information, assess the reliability of the information, and/or increase the likelihood or ensure that flight information provided to the user is accurate and reliable. In addition, the inventors have developed methods to remove non-bookable or non-findable solutions to improve speed in searching the cache, and to ensure such results are not presented to the user.

In some embodiments, a machine learning process is used to assess the fidelity of flight information stored in a cache. As used herein, the term "fidelity" refers to the accuracy or reliability of the information stored in the cache. For example, the fidelity of flight information includes, but is not limited to, the accuracy of pricing information, accuracy of departure/ arrival times, whether a flight is available (e.g., findable and/ or bookable), whether a stored flight exists, whether a route is correct or any assessment regarding how closely information stored in the cache reflects actual and true information about flights.

According to some embodiments, the machine learning process learns to identify likely bookable flight solutions, identify non-bookable solutions, correct pricing information, assess reliability, or otherwise maintain a more accurate and robust cache of flight information. According to some embodiments, the cache enumerates possible solutions between origin/destination pairs. Some embodiments maintain statistics on the flight information to improve reliability of the cache. For example, statistically non-bookable or non-findable solutions may be blacklisted (e.g., the cache may additionally maintain the frequency that a flight was not findable or not bookable on each provider's website and remove solutions that do not meet a given reliability requirement). The cache may also maintain temporal variations such as seasonal or holiday fluctuations (e.g., during the winter season direct flights between Larnaca (LCA) and Sofia (SOF) may be available only on Tuesdays and Fridays, and during the summer season direct flights may be available daily) to improve reliability of the flight information stored in the cache.

According to some embodiments, machine learning models are trained to classify flight information in a cache based on the likelihood that the flight information is accurate and reliable (e.g., in regards to pricing and/or whether a flight is available, findable and/or bookable). When a user performs a query that can be resolved, at least in part, via the cache, appropriate action may be taken based upon the classification of the flight information as characterized by the trained models. The models may be trained by applying them to a cache and comparing the results to a ground truth containing actual data regarding the accuracy of the flight information in the cache. The models may then be adapted based on any discrepancies until the models perform satisfactorily. Other method of training models using a ground truth to guide/ evaluate the training may be used, as aspects of the invention are not limited by the manner in which the models are trained.

Following below are more detailed descriptions of various concepts related to, and embodiments of, methods and apparatus according to the present invention. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates a networked computer system on which aspects of the invention may be performed, and depicts a computer system by which a user may query a flight search service for available flights that meet a user's specified criteria. Computer system 100 includes one or more user devices 110. User device 110 may include one or any combination of personal computer, workstation, networked terminal, kiosk, personal digital assistant (PDA), smart phone or any other electronic device that allows a user to access network 120. Network 120 may include any one or combination of networks such as private networks, public networks, the Internet, or any combination of local area networks (LANS), wide area networks (WANs), etc. In general, user device 110 may be any device or combination of devices that allows a user to perform a query and obtain results.

Computer system 100 also includes flight search service 130 configured to perform flight queries on behalf of a user. For example, a user may provide a query by specifying criteria including origin/destination and departure/return date pairs. Flight search service 130 may present to the user available flights that match the specified criteria. Flight search service 130 may include one or multiple computers, computer systems, servers, data storage devices, etc. Flight search service 130 may include data storage for storing a flight cache 105 accessible by the one or more computers forming the flight search service 130. For example, the flight cache 105 may be stored in memory as part of a database that can be queried by the one or more computers forming the flight search service 130, or otherwise stored such that it can be accessed to obtain flight information in response to user queries. A flight cache may be stored on any type or combination of computer readable storage medium described herein. Flight cache 105 will be discussed in detail below.

Flight search service 130 may be connected to network 120 and configured to communicate with the user device 110 and one or any combination of flight information resources 140. Flight search service 130 may be configured to query one or more of the different flight information resources connected to the network to obtain flight pricing and availability information. Flight search service 130 may use these results to report results to a user, update the cache 105, or both. As discussed in further detail below, flight search service 130 may include one or more programs stored on a computer readable medium and executable by one or more processors available in or to the one or more computers forming the travel service provider. The one or more programs may be configured, when executed, to perform queries, probe the cache, perform cache modification, update or classification, and/or any other technique described herein.

Figure 2:
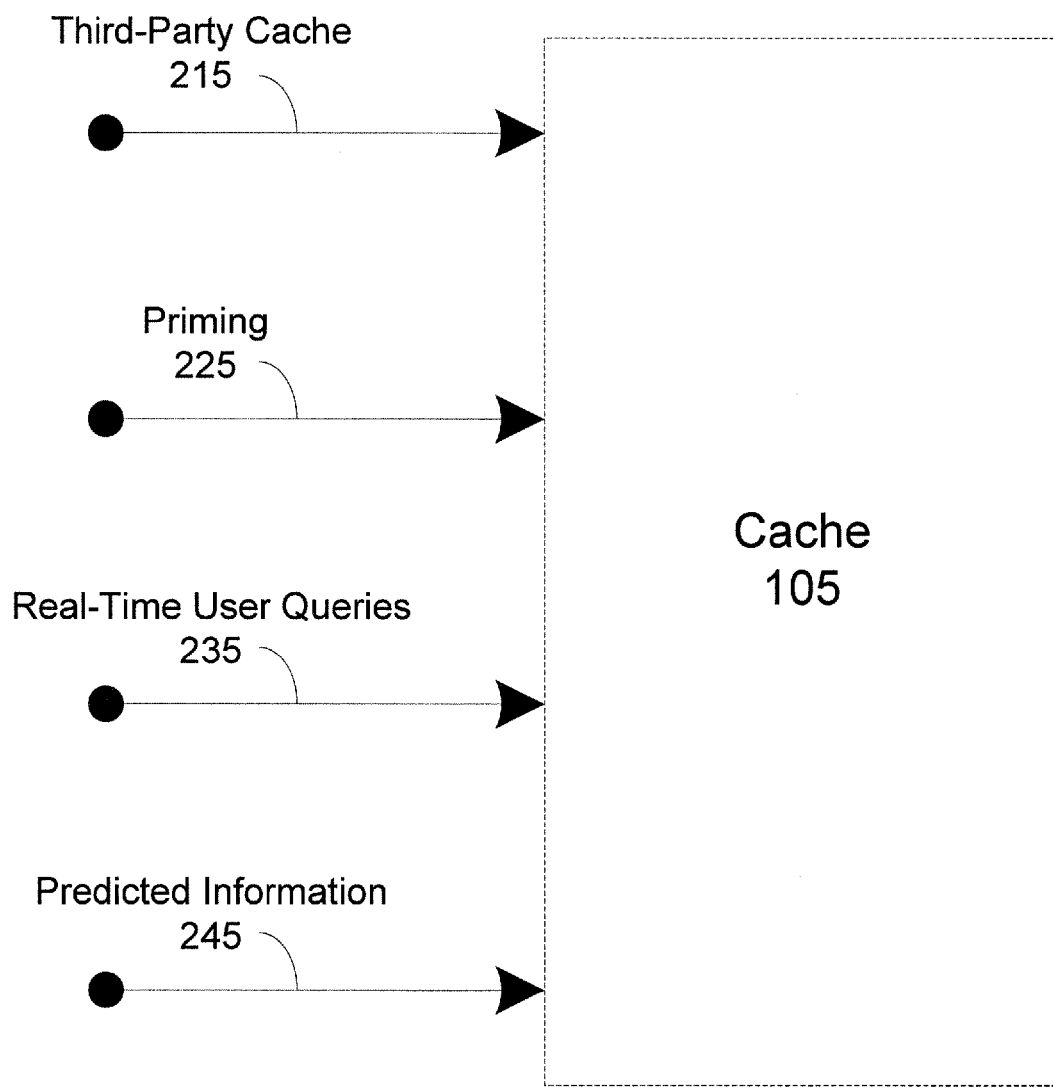
FIG. 2 illustrates an exemplary flight information cache with a number of illustrative sources by which the cache may be fed.

FIG. 2 illustrates an exemplary cache 105 supplied with flight information from a variety of sources. Cache 105, as an example, receives cache flight information from third-party echo cache(s) 215, priming 225, real-time user queries 235 and/or predicted flight information 145. A cache need not receive information from each of the these sources, and may receive information from alternative sources, as the aspects of the invention are not limited by the ways in which a cache is constructed and populated. That is, a cache may be built, modified or updated using any one or combination of the above described sources and/or using other sources not explicitly described herein.

The cache may include any type or amount of flight information desired. For example, the cache may include available flight solutions for a desired set of origin/destination pairs. In particular, the cache may include any one or combination of flight numbers, time of day, air fair basis codes, numeric availability per air fare basis code, as it is captured by the pricing engine or other availability sources (e.g., an airline CRS system, or a cached availability source maintained by a GDS), historical statistical metrics of the pricing stability of that airfare solution (e.g., including rate of change per day over the total observed period, rate of change as a function of days until departure), number of days until departure, trip length, number of stops, historical accuracy rates for similar airfare solutions (i.e., airfare solutions of same number of stops, and similar waiting times), historical and predicted probabilities of a click for that search based on the relative rank of the flight in terms of price, number of stops, and duration (cheaper flights get more clicks, fewer stops get more clicks), etc. It should be appreciated that the cache may include any flight information and/or supplemental information that assists in providing flight solutions in response to user queries.

As discussed above, cache 105 provides a source of flight information that can be queried without having to perform costly and relatively time intensive queries to the various flight information resources. As such, one goal of creating cache 105 is to increase the hit rate of the cache to the extent possible to avoid as many live queries as possible.

The inventors have recognized that a cache may be significantly expanded without using valuable live queries by utilizing the cache of one or more third party providers that themselves have performed the associated live query. For example, some GDS sources store the live queries that they perform and the results from the live queries. If this information store can be accessed, it can be used to expand cache 105 with generally up-to-date pricing and availability information. That is, this information store provides generally up-to-date information regarding user queries that have been performed within some specified period of time that can be used to update and/or expand a cache without having to expend any live queries by virtue of the fact that the third party provider has already performed the live query. Accordingly, the flight search service may access such caches periodically (e.g., every hour) and update cache 105 with more current flight information, or expand the cache with new flight information that was not available the last time the third party cache was queried.

The inventors have appreciated that this information may be obtained in a number of ways. A first method is to have the third party provider push updated information to the flight search service so that the cache may be updated and/or expanded. However, some third party providers may not be willing to push queries and results to the flight search service, but may make the queries that have been performed available and also allow the flight search service to query the echo-cache to obtain the results from said queries. Using this technique, the flight search service may pull the information from the third party cache. Using either a push or pull technique, or a combination of both, flight information may be obtained to update and/or expand cache 105 without having to use limited live queries in the process.

It may be necessary or desirable to obtain more information for a cache than can be obtained from third party cache (s). In addition, such third party cache information may not be available at all and other techniques may need to be relied upon to build cache 105. One example of such a technique that can be used in conjunction with or in the absence of echo cache information is priming, depicted as priming 225 in FIG. 2. Priming 225 refers to making live queries to any of various available flight information resources to obtain flight information for a cache.

As discussed above, live queries have an associated cost so that priming should be minimized to the extent possible to avoid using limited and/or costly queries. For example, many flight search services have contracts with one or more flight information resources that specify the volume or number of allowed queries that the flight search service is permitted to perform (queries in excess of agreed upon volumes may be prohibited, or excessive penalty fees may be charged for exceeding the contracted for volume). Accordingly, the flight search service will likely have a limited number of queries that can be made during a given time period. As a result, the queries the flight search service uses for priming should be optimized with respect to hit-rate. For example, the flight search service may choose priming queries that are more likely to be queried by users and avoid spending valuable queries to store flight information for queries that a user is less likely or unlikely to make. The inventors have identified a number of techniques that facilitate optimization of the priming queries to minimize the number of queries while tending to maximize hit rate, including techniques to identify queries that a user is more likely to make.

The inventors have recognized that price correlates query frequency and such that cheaper flights therefore may represent desirable candidates for priming. Users are more inclined to inquire about cheaper flights than more expensive flights. Pricing information can be obtained from a pricing source such as the Airline Tariff Publishing Company (ATPCO), which publishes pricing logic regularly (e.g., every hour). Thus, such pricing information may be used effectively to identify which flights are likely to be explored by a user and thus operate as indicia suggestive of high value candidates for a priming queries over more expensive flights. As a result, the hit rate of a flight information cache may be improved by preferentially priming lower cost flights.

Historical data may also be used to predict what queries users are likely to make. For example, historical data may indicate what origin/destination pairs are the most popular and when they are the most popular. Seasonal, time of day, day of the week (departure/return dates and/or times) or other indicia may also be used to identify flight queries that users will likely be interested in. Such identified queries may then be used to prime the cache to facilitate the formation of a cache with an acceptable hit rate. Historical data may relate to data from any time in the past. Recent historical data or statistics on user queries may provide effective predictions as to what searches will be requested again. For example, queries to be primed may be selected based on the most frequently requested origin/destination pairs from the day before (e.g., the top origin/destination pairs that account for some desired percentage of user queries for the day before). These top origin/destination pairs can be used to prime the cache, for example, by priming the cache with all trips 1-N days out (e.g., 1-30 or 1-60, etc.) and 1-M days of length (e.g., 1-7 or 1-14, etc.) for each of the top origin/destination pairs.

The inventors have appreciated that when queries that users are likely to make have been identified (by whatever means), such queries may be expanded on geographically and/or temporally to identify other queries that users are likely to be interested in, and thus should be considered for priming candidates. For example, if flights from John F. Kennedy (JFK) airport to Paris-Charles de Gaulle (CDG) airport are identified as popular user queries, this query may be expanded geographically at the origin and/or destination to identify additional candidate queries for priming. In the example above, if JFK/CDG queries are identified as popular, queries from Newark International Airport (EWR) to DGR, queries from JFK to Paris-Orly airport (ORY) and/or EWR/ORY may also be popular queries for user's trying to find the optimal prices, times or dates from the New York City area to the Paris vicinity. Accordingly, queries identified as popular may be geographically expanded to identify additional queries. That is, a geographical window about an identified query may be selected to identify additional candidates for priming queries.

Similarly, an identified query may expanded temporally to identify additional candidates for priming queries. For example, a certain origin/destination pair may be identified as popular for given departure/return dates. These dates may be expanded to include a desired number of days about the given departure/return dates to include additional queries within a desired time frame proximate the identified query. For example, considering dates plus or minus three days about the departure/return dates of a identified or predicted popular query results in queries within a week of the identified query, which has been recognized by the inventors to comport with user search behavior when trying to locate a flight. Accordingly, queries identified as popular may be temporally expanded to identify additional queries. That is, a temporal window about an identified query may be selected to identify additional candidates for priming queries.

The inventors have appreciated that, when one or more third party caches are available, information from such third party caches may be utilized to assist in identifying popular flight queries to bootstrap forming geographic and temporal windows to identify addition candidate priming queries. For example, popular queries may be identified based on the actual queries made by users as captured by one or more third party caches. Once identified from the third party caches, these queries may be expanded upon geographically and/or temporally to identify further candidates for priming queries. Additionally, third party cache information, when available, may also drive which queries are not primed. For example, if certain queries/results are already available in the third party cache, then it may be undesirable to use a live query to obtain this information even though other indicia (e.g., price, accuracy, likelihood) would otherwise suggest that the query is a desirable candidate for priming. That is, if the target flight information (or a close equivalent) is already available from a third party cache, the decision to forego using a live query to prime cache 105 may be made to preserve limited and/or costly live queries to flight information resources.

As discussed above, some embodiments include applying intelligent algorithms or machine learning techniques to a cache to classify the information in the cache (e.g., to classify flight information according to pricing accuracy, availability, reliability, etc.). To apply such intelligent algorithms or machine learning techniques to the cache, machine learning models typically need to be trained on training data. FIG. 3 illustrates a method of training models to process a cache and classify the flight information therein based upon the fidelity (e.g., accuracy, availability, reliability, etc.) of the information, in accordance with some embodiments.

Figure 3A:
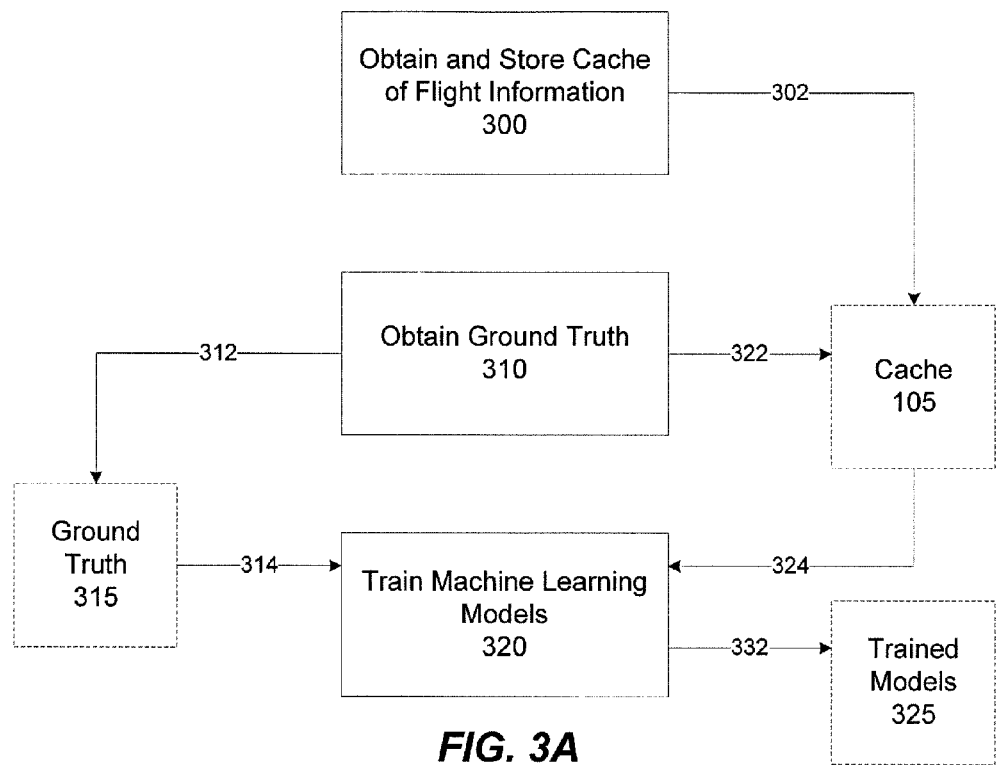
FIG. 3A illustrates a method of training machine learning models to classify flight information stored in a flight information cache, in accordance with some embodiments.

Referring to FIG. 3A, in act 300, a cache of flight information is obtained and stored as cache 105. Cache 105 may be obtained using any one or combination of techniques described above, or may be obtained in other ways. According to some embodiments, the cache includes flight solutions having available routes between a desired number of origin/destination pairs and associated information about the routes such as departure times and dates, etc. The flight information cache may be obtained at any point in time and may be updated and modified on a regular basis, or at time that is desired.

It should be appreciated that cache 105 may include flight information at any level of comprehensiveness, but generally is extensive enough to allow flight solutions to be obtained from the cache and presented to a user in response to a user query at an acceptable hit-rate (e.g., the cache will generally include enough information that the flight search service can obtain information from the cache to service a query without having to, or limiting the necessity of, directly query the flight information resources in enough instances that the user does not experience unacceptable levels of delay in receiving results). According to some embodiments, cache 105 is a comprehensive archive of all available routes between a desired set of origin/destination pairs. As discussed above, the inventors have developed a number of techniques that facilitate optimizing generating and updating a flight information cache.

To train the models, the models may be applied to process the cache and the results of the analysis (e.g., reliability assessments/predictions from the models) compared to actual flight data, referred to herein as "ground truth." The more reliable the ground truth, the more effective the machine learning models will be at assessing and maintaining a reliable cache. In act 310, a ground truth 315 is obtained to train machine learning models to analyze cached flight information to assess the reliability of the flight information. The ground truth may be obtained in any manner that allows reliable availability, pricing, bookability and/or findability information about flights/airfares to be obtained. According to some embodiments, the ground truth is obtained by testing the bookability of flight options/fares on actual airline websites, or online travel agencies (such as orbitz.com, expedia.com, etc) in a process referred to herein as "scraping."

Scraping to obtain the ground truth may be accomplished using actual user bookings (e.g., a user clicks on a flight option provided in response to a query by the user, or chooses a solution provided by the website) or obtained by simulating the selection/booking of a flight option or selection of a flight solution provided by a website. Scraping may be performed offline (e.g., by simulating user selections) alone or performed/updated using actual user selections by users booking flights (e.g., real-time update), as the aspects of the invention are not limited to any particular method of obtaining the ground truth. The information obtained via scraping can be used not only to compile a ground truth, but may be used to update, supplement and/or otherwise modify the cache. For example, the scraping process may be used to enrich the cache data (e.g., by always scraping the cheapest nonstop and one-stop airfare solutions, or the cheapest 5 solutions, etc), or otherwise collecting additional available search results from the website that the cache may not previously have archived.

The scraping process can confirm bookability of a selected flight solution, as well as collect additional solutions available by the website being scraped to verify bookability (e.g., confirm whether the expected fare for the corresponding flight number combinations (solutions) is bookable for the expected price and/or the expected airfare basis codes), correct the pricing of the airfare solutions found in the GDS/CRS system (e.g., confirm price changes, detect price miscalculation, or identify availability changes causing a different fare for the same flight numbers). Additionally, the cache obtained from third party providers resulting from actual user queries may also be used as ground truth for training the models, or by other methods not specifically described herein.

In act 320, machine learning models 325 are trained by applying the models to cache 105 and the results are checked against ground truth 315. The models are then modified to produce better results as informed by the ground truth. This process continues until the models are suitably trained to accurately assess the reliability of the data in cache 105. The models may be formulated according to any suitable machine learning algorithm and trained according to any suitable optimization scheme, as the aspects of the invention are not limited to any particular algorithm, technique or training scheme.

According to some embodiments, after the ground truth has been obtained, the machine learning models may operate on the cache and learn to assess the reliability of the flight information stored in the cache. For example, the machine learning models may learn to categorize or classify the flight information, guided by the ground truth, so that the trained machine learning models can operate on the cached flight information to maintain a more reliable cache. Any one or combination of machine learning techniques may be used including decision trees, support vector machines (SVMs), neural networks, nearest neighbors, random forest, or other supervised learning algorithms. According to some embodiments, random forest algorithms, or an ensemble trees techniques (e.g., boosted decision trees, bagged decision trees, etc.) may be used to reduce the computational complexity as compared to some other techniques, such as SVM approaches.

Machine learning models may be trained to consider any number of factors or parameters so as to classify flight information in a cache based on the accuracy, availability, reliability, etc., of the cached flight information. Some non-limiting examples of factors that may be considered by the machine learning models are discussed in further detail below. The number of stops from origin to destination has been recognized as an indicator of reliability of the data, with reliability of the data decreasing with increased stops. Additionally, the route taken to reach a destination may also impact reliability. For example, flights that are routed through a significant hub tend to have a greater measure of reliability than flights that are routed through secondary or non-hub airports. Booking class (e.g., coach, first class, etc.) and/or whether a purchase is non-refundable represent ticket-level indicia of reliability. Code sharing (e.g., when a first airline sells tickets on a flight/plane operated by a different airline) generally suffers from lower levels of reliability than similarly situated flights that do not utilize code sharing. The time of day and/or day of the week may also impact the reliability of the flight information. Other factors that may impact reliability and that may be considered when training the models are how long the trip is, how far out the departure date is, and how long the query to obtain the flight solution took (e.g., generally, the longer the query took to complete, the more complicated and less reliable the solution). The airline or airlines involved in the flights may also be considered, and according to some embodiments, models are trained specifically for different airlines. It should be appreciated that one or any combination of the above factors and/or one or more additional factors may be considered when training models to evaluate and classify flight information stored in a flight cache, as the aspects of the invention are not limited by the factors used in training the models.

The machine learning models may operate on any data in the cache to learn any number of characteristics about the flight information in the cache, to asses and predict which data is reliable and which data is not. For example, the machine learning models may learn a discrete set of classes such as: 1) accurate fare solution: the fare is both findable and capable of being priced; 2) inaccurate fare solution due to pricing problems; 3) findable solutions with a price that differs from the price found in the GDS/CRS because of pricing change of a portion of the solution (e.g., one or more of the legs of the solution) is no longer available; 4) the solution is findable, but has a price that differs by more than a predefined threshold (e.g., a rule may be encoded to reject pricing differences of more than $1, $10, or some other threshold when the price is higher by at least the threshold, but accept as valid the price in circumstances where the true price is actually lower than the price reflected in the cache; and/or 5) the solution is not findable at all. The models may, additionally or alternatively, learn any other set of classes that assist in categorizing the flight information in a cache based on fidelity.

The machine learning models may identify likely bookable airfare solutions, with low confidence availability. For example, based on the data collected with the process described in the foregoing, the learning models may learn a separate class for airfare solutions that are likely to be priced correctly, but with low probability of still being available, therefore flagging the solution so that it can be checked for current availability against the GDS/CRS. The machine learning models may also identify airfare solutions that need to be re-priced. Based on the data collected with the process described in the foregoing, the supervised learning algorithm may learn a separate class for airfare solutions that are unlikely to be priced correctly, but the combination of flights may be still available for a different booking class, airfare booking code, or one or more other pricing parameters, thereby flagging the solution so that it can be re-priced by the GDS/CRS. Accordingly, the models may classify flight solutions according to reliability and indicate what actions to take depending on the reliability of the corresponding classification.

As should be appreciated from the foregoing, a purpose of classifying the flight information stored in a cache is to allow the flight search service to take appropriate action based on the assessment of the machine learning models. For example, based on the classification, the corresponding flight information may need to be treated in different ways. When the models, for example, ascertain that a flight solution is likely available but at a different price (i.e., the cached price is likely inaccurate), the flight search service may simply re-price the flight but not query regarding availability. On the other hand, if the models determine that a flight solution is likely priced accurately, but there is a risk that the flight is not available, the flight search service may keep the price, but check on the availability (e.g., via a live query). In some instances, the models may determine that neither pricing or availability are reliable and a full query may be performed by the flight search service.

Classification by the models may also guide how flight solutions obtained responsive to user queries are presented to the user. For example, based on the classification given to a given flight solution, the flight search service may decide to not display the flight solution at all due to misgivings about its reliability. In other instances, the flight search service may display a flight solution but flag the solution in a manner to indicate that the solution may either be inaccurately priced or not available. In still other instances, a given flight solution may be displayed, but not priced. The decision on how, or whether, to present flight solutions to the user may also be impacted or even changed depending on what actions the flight search service decides to take (e.g., whether the flight search service decides to re-price, check availability, etc.), as discussed in further detail below. It should be appreciated that other actions and/or variations on presentation may be taken or used based upon classifications from the machine learning models, as the aspects of the invention are not limited in this respect.

As discussed above, machine learning models may be built and trained such that, given a new airfare search/flight query (e.g., given a request to search for flights meeting criteria that may include any combination of origin/destination, duration of stay, and number of days out for departure date, frequency, etc.), the models can make a prediction about each solution obtained from the cache that meet the user's submitted criteria and categorize each solution according to the following exemplary classes: 1) trusted result in which the action taken is to provide solutions to the user as is (e.g., the solutions are findable and priceable); 2) relatively trusted result in which the action is to return all solutions, but query a CRS, GDS, or other availability system to filter non-available solutions before presenting solutions to the user; 3) less trusted result in which the action taken is to re-price solutions prior to presenting solutions to the user; and 4) not trusted in which the action taken is to re-run a full query and discard currently cached results. The machine learning models may include any number of classes that result in any number of different actions suitable for the identified class, as the aspects of the invention are not limited in this respect.

It should be appreciate that the machine learning models may be applied to live user queries to classify solutions and take the appropriate action, or the models may be applied to the cache periodically to categorize solutions with the corresponding class label. The latter offline solution may be employed when the computation required to perform live filtering degrades the user experience or is otherwise undesirable. In some embodiments, the machine learning models are employed in part offline and in part during live queries. As a general matter, the machine learning models may be applied to the cache at anytime to classify/categorize the solutions, optimize the speed of live queries and/or otherwise render the cache more reliable and/or more time efficient to search, as the aspects of the invention are not limited in this respect.

Figure 3B:
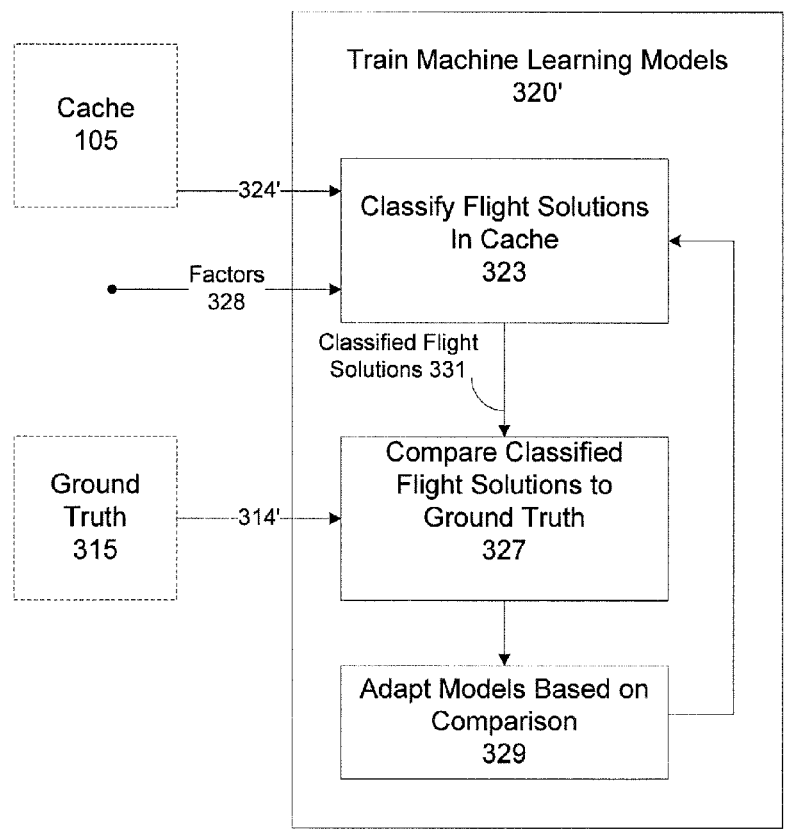
FIG. 3B illustrates a method of training machine learning models to classify flight solutions based on a plurality of factors indicative of the fidelity of the flight information, in accordance with some embodiments.

FIG. 3B illustrates a method for training models that incorporates techniques described in connection with FIG. 3A and in other locations herein. In particular, act 320' may include at least some features of act 320 performed in the method illustrated in 3A. The one or more machine learning models in conjunction with the ground truth may be used to predict which flight information on which the cache is being build is stale or otherwise unreliable.

In act 323, one or more machine learning models are used to process the flight information cache 105 to classify the flight solutions stored therein according to a plurality of factors 328. Factors 328 may be any factor that tends to indicate or suggest the fidelity of the flight solution stored in cache 105 and may include, but is not limited, the various factors discussed herein. Classified flight solutions 331 result from applying the one or more machine learning models to the flight solutions stored in cache 105. The classified flight solutions may include flight solutions labeled with a class indicative of the fidelity of the flight solution as assessed by the one or more machine learning models. The classification may include appending information or otherwise associating information with the flight solution to indicate which class the flight solution belongs to or otherwise indicating the fidelity of the classified flight solution.

In act 327, the classified flight solutions are compared with the ground truth to determine whether the machine learning models appropriately classified the flight solutions. The correctness or incorrectness of the classifications may then be used to adapt or modify the machine learning models so that the models better classify flight solutions. This process may be repeated until the machine learning models have been trained such that they deliver acceptable levels of accuracy in appropriately or correctly classifying flight solutions. The trained models (e.g., trained models 325) may then be applied to the cache or flight solution obtained responsive to real-time user search queries to assess the fidelity of flights solutions stored in a cache.

Figure 4:
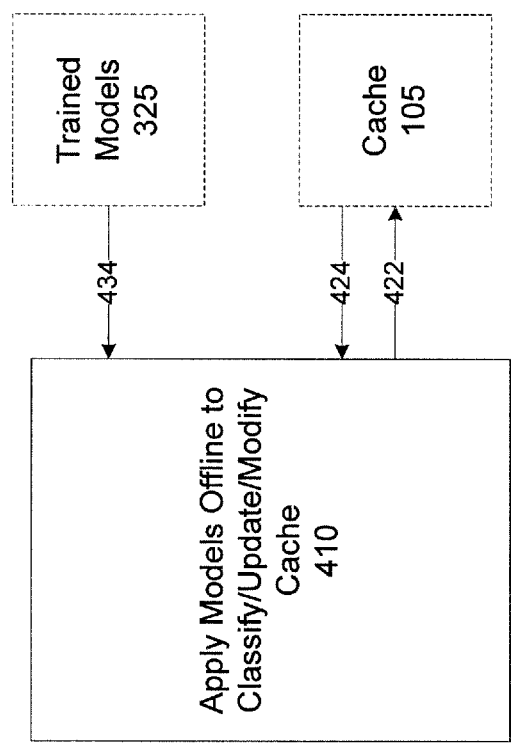
FIG. 4 illustrates a method of applying trained machine learning models to a cache offline, in accordance with some embodiments.

FIG. 4 illustrates a method of applying trained models offline to classify/modify/update a cache 105, in accordance with some embodiments. In act 410, the trained models 325 are applied to the cache 105 offline to classify, categorize, update and/or modify cache 105 to label the reliability of the flight information in cache 105. For example, trained models 325 may process the flight information and classify the various flight solutions (e.g., flight availability, bookability, pricing, etc.) according to the predicted reliability of the respective flight solution. The classification may then be used to determine what actions to take in the event that corresponding flight solutions meet the criteria of an actual user query (e.g., a subsequent user query as described in connection with FIG. 5 below). By applying the models offline, the computational cost of applying the models live may be avoided.

Figure 5:
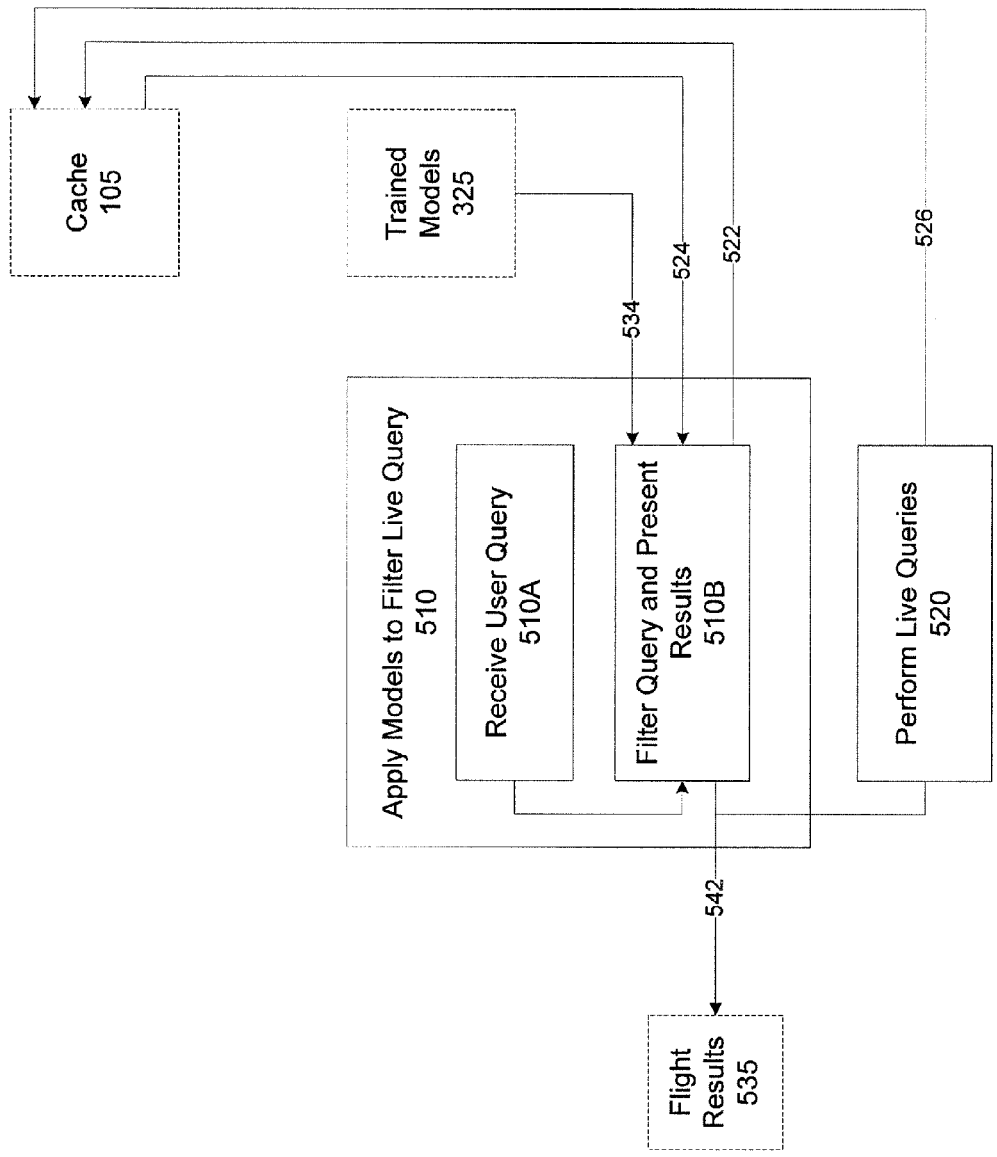
FIG. 5 illustrates a method of applying trained machine learning models to flights solutions obtained from a cache in response to a live user query, in accordance with some embodiments.

FIG. 5 illustrates a method of applying trained models to user queries, in accordance with some embodiments. In act 510, the trained models 325 are used to filter live queries by a user. For example, a user may submit a query for flight solutions that match one or more desired criteria provided by the user (act 510A). The trained models 325 are applied to the flight solutions obtained from cache 105 to assess the reliability of the flight solutions. For example, the trained models may classify the flight solutions according to reliability and the appropriate actions may be taken prior to presenting the flight solutions to the user. For example, for less reliable flight solutions, the flight information resources may be queried to confirm that the flight solution is or is not accurate. Once the appropriate actions have been taken, the flight results 535 are presented to the user in response to the user query. As indicated by path 522, cache 105 may be updated based on information obtained upon any new query to the flight information resources to update the cache with current information or information that was previously not available.

As discussed above, based on the classification of flight information or solutions obtained from the cache in response to a user query, the flight search service may want to perform one or more live queries to obtain actual flight information, for example, when the classification suggests that the pricing and/or availability of a given flight may not be reliable. In act 520, one or more live queries is performed and the resulting flight solutions may be presented to the user, and the cache 105 may be updated with the current flight information/flight solution that was queried.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

Components of data-entry systems described herein may be implemented using a single computer or its functionality may be distributed across multiple computers or servers. In distributed settings, communication among system components/modules/interfaces may be realized in any suitable manner (e.g., wired, wireless, network-based connections) as the present invention is not limited in this respect.

It should be appreciated that a computer may be embodied in any of numerous forms, such as a rack-mounted computer, a desktop computer, a laptop computer, or a tablet computer. Additionally, a computer may be embodied in any device with suitable processing capabilities, including a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

Figure 6:
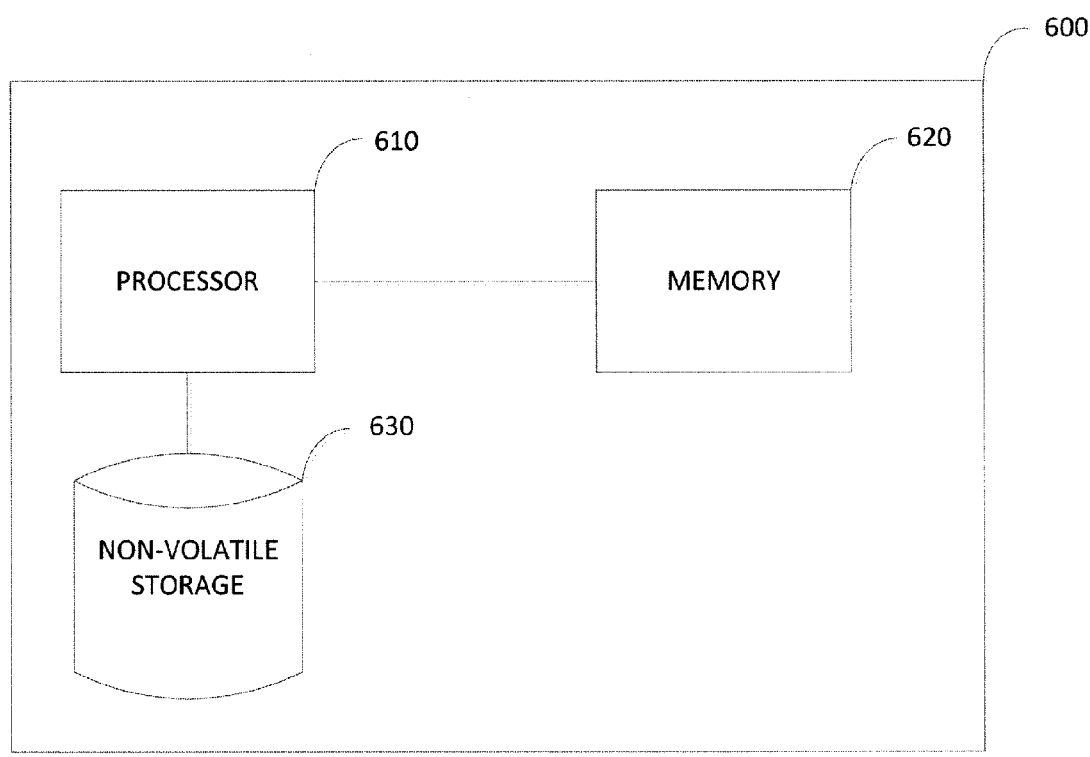
FIG. 6 illustrates an exemplary computer that may be used to implement one or more embodiments described herein.

An illustrative implementation of a computer system 600 that may be used in connection with any of the embodiments of the invention described herein is shown in FIG. 6. The computer system 600 may be used as the or one of the computer system comprising the flight search service computer system, user device and/or flight information resources, and may include one or more processors 610 and one or more non-transitory computer-readable storage media (e.g., memory 620 and/or one or more non-volatile storage media 630). The processor 610 may control writing data to and reading data from the memory 620 and the non-volatile storage device 630 in any suitable manner, as the aspects of the invention described herein are not limited in this respect. To perform any of the functionality described herein, the processor 610 may execute one or more instructions stored in one or more computer-readable storage media (e.g., the memory 620), which may serve as non-transitory computer-readable storage media storing instructions for execution by the processor 610.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one computer readable storage medium (e.g., a computer memory, one or more floppy discs, hard discs, compact discs, optical discs, magnetic tapes, flash memories, circuit configurations in Field Programmable Gate Arrays, cache, or other semiconductor devices capable of storing data, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above. The term computer readable storage medium is used herein to describe any tangible medium capable of storing data, such as the example media mentioned above, but excludes propagating signals and carrier waves, and the term non-transitory computer readable storage medium is co-extensive in this respect.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method comprising:
generating a flight information cache storing flight information comprising a plurality of flight solutions, the cache capable of being accessed to obtain flight solutions that meet a criteria specified in one or more flight search queries;
applying at least one machine learning model to at least some of the flight information in the flight information cache to classify at least one of the plurality of flight solutions according to an assessed fidelity of the at least one flight solution, wherein the at least one machine learning model classifies flight solutions by assigning at least one of a plurality of classes to each of the plurality of flight solutions; and
performing at least one action based on the classified plurality of flight solutions.

2. The method of claim 1, wherein at least one of the plurality of classes indicates an accuracy of pricing information associated with a flight solution.

3. The method of claim 1, wherein at least one of the plurality of classes indicates a likelihood of availability of a given flight solution.

4. The method of claim 3, wherein at least one of the plurality of classes indicates a likelihood of whether a given flight solution is findable.

5. The method of claim 3, wherein at least one of the plurality of classes indicates a likelihood of whether a given flight solution is bookable.

6. The method of claim 2, wherein performing at least one action includes re-pricing a flight based on the indication of the accuracy of the pricing information of at least one flight solution.

7. The method of claim 3, wherein performing at least one action includes confirming availability for a flight based on the likelihood of availability of at least one flight solution.

8. The method of claim 1, further comprising:
receiving a search query from a user requesting flight solutions that meet a specified criteria; and
obtaining at least one flight solution that meets the criteria from the flight information cache.

9. The method of claim 8, wherein performing at least one action includes performing at least one action based on a class assigned by the at least one machine learning model to at least one of the at least one flight solutions that meet the criteria.

10. The method of claim 9, wherein the at least one flight solution includes a plurality of flight solutions that meet the criteria, the method further comprising providing a subset of the plurality of flight solutions that meet the criteria to the user based, at least in part, on a class assigned by the at least one machine learning model to one or more of the plurality of flight solutions that meet the criteria.

11. The method of claim 1, wherein the at least one machine learning model is trained to consider a plurality of factors when assessing the fidelity of a flight solution, the plurality of factors being selected from a group of factors consisting of: a number of stops in a flight solution; a route of a flight solution; an airline providing a flight solution; a booking class of a flight solution; a departure date of a flight solution; and a return date of a flight solution.

12. At least one non-transitory computer readable storage medium storing instructions, that when executed by at least one processor, performs a method comprising:
   generating a flight information cache storing flight information comprising a plurality of flight solutions, the cache capable of being accessed to obtain flight solutions that meet a criteria specified in one or more flight search queries;
   applying at least one machine learning model to at least some of the flight information in the flight information cache to classify at least one of the plurality of flight solutions according to an assessed fidelity of the at least one flight solution, wherein the at least one machine learning model classifies flight solutions by assigning at least one of a plurality of classes to each of the plurality of flight solutions; and
   performing at least one action based on the classified plurality of flight solutions.

13. The at least one non-transitory computer readable storage medium of claim 12, wherein at least one of the plurality of classes indicates an accuracy of pricing information associated with a flight solution.

14. The at least one non-transitory computer readable storage medium of claim 12, wherein at least one of the plurality of classes indicates a likelihood of availability of a given flight solution.

15. The at least one non-transitory computer readable storage medium of claim 14, wherein at least one of the plurality of classes indicates a likelihood of whether a given flight solution is findable.

16. The at least one non-transitory computer readable storage medium of claim 14, wherein at least one of the plurality of classes indicates a likelihood of whether a given flight solution is bookable.

17. The at least one non-transitory computer readable storage medium of claim 13, wherein performing at least one action includes re-pricing a flight based on the indication of the accuracy of the pricing information of at least one flight solution.

18. The at least one non-transitory computer readable storage medium of claim 14, wherein performing at least one action includes confirming availability for a flight based on the likelihood of availability of at least one flight solution.

19. The at least one non-transitory computer readable storage medium of claim 12, further comprising:
   receiving a search query from a user requesting flight solutions that meet a specified criteria; and
   obtaining at least one flight solution that meets the criteria from the flight information cache.

20. The at least one non-transitory computer readable storage medium of claim 19, wherein performing at least one action includes performing at least one action based on a class assigned by the at least one machine learning model to at least one of the at least one flight solutions that meet the criteria.

21. The at least one non-transitory computer readable storage medium of claim 20, wherein the at least one flight solution includes a plurality of flight solutions that meet the criteria, the method further comprising providing a subset of the plurality of flight solutions that meet the criteria to the user based, at least in part, on a class assigned by the at least one machine learning model to one or more of the plurality of flight solutions that meet the criteria.

22. The at least one non-transitory computer readable storage medium of claim 12, wherein the at least one machine learning model is trained to consider a plurality of factors when assessing the fidelity of a flight solution, the plurality of factors being selected from a group of factors consisting of: a number of stops in a flight solution; a route of a flight solution; an airline providing a flight solution; a booking class of a flight solution; a departure date of a flight solution; and a return date of a flight solution.

23. A system comprising:
   at least one non-transitory computer readable storage medium storing a cache of flight information comprising a plurality of flight solutions, the cache capable of being accessed to obtain flight solutions that meet a criteria specified in one or more flight search queries; and
   at least one computer programmed to:
      apply at least one machine learning model to at least some of the flight information in the flight information cache to classify at least one of the plurality of flight solutions according to an assessed fidelity of the at least one flight solution, wherein the at least one machine learning model classifies flight solutions by assigning at least one of a plurality of classes to each of the plurality of flight solutions; and
      perform at least one action based on the classified plurality of flight solutions.

24. The system of claim 23, wherein at least one of the plurality of classes indicates an accuracy of pricing information associated with a flight solution.

25. The system of claim 23, wherein at least one of the plurality of classes indicates a likelihood of availability of a given flight solution.

26. The system of claim 25, wherein at least one of the plurality of classes indicates a likelihood of whether a given flight solution is findable.

27. The system of claim 25, wherein at least one of the plurality of classes indicates a likelihood of whether a given flight solution is bookable.

28. The system of claim 24, wherein the at least one computer is programmed to re-price a flight based on the indication of the accuracy of the pricing information of at least one flight solution.

29. The system of claim 25, wherein performing at least one action includes confirming availability for a flight based on the likelihood of availability of at least one flight solution.

30. The system of claim 23, further comprising at least one input to receive a search query from a user requesting flight solutions that meet a specified criteria, and wherein the at least one computer is programmed to obtain at least one flight solution that meets the criteria from the flight information cache.

31. The system of claim 30, wherein the at least one computer is programmed to perform at least one action based on a class assigned by the at least one machine learning model to at least one of the at least one flight solutions that meet the criteria.

32. The system of claim 31, wherein the at least one flight solution includes a plurality of flight solutions that meet the criteria, and wherein the at least one computer is programmed to provide a subset of the plurality of flight solutions that meet the criteria to the user based, at least in part, on a class assigned by the at least one machine learning model to one or more of the plurality of flight solutions that meet the criteria.

33. The system of claim 23, wherein the at least one machine learning model is trained to consider a plurality of factors when assessing the fidelity of a flight solution, the plurality of factors being selected from a group of factors consisting of: a number of stops in a flight solution; a route of a flight solution; an airline providing a flight solution; a booking class of a flight solution; a departure date of a flight solution; and a return date of a flight solution.

34. The method of claim 8, wherein the cache of flight information comprises flight solutions obtained from live queries performed prior to receiving the search query from the user, including flight solutions obtained from one or more live queries performed by a third party provider and/or flight solutions obtained from one or more priming queries.

35. The at least one computer readable medium of claim 19, wherein the cache of flight information comprises flight solutions obtained from live queries performed prior to receiving the search query from the user, including flight solutions obtained from one or more live queries performed by a third party provider and/or flight solutions obtained from one or more priming queries.

36. The system of claim 30, wherein the cache of flight information comprises flight solutions obtained from live queries performed prior to receiving the search query from the user, including flight solutions obtained from one or more live queries performed by a third party provider and/or flight solutions obtained from one or more priming queries.

* * * * *